United States Patent
Sudo et al.

(10) Patent No.: US 7,241,528 B2
(45) Date of Patent: Jul. 10, 2007

(54) CATALYTIC ELECTRODES AND PRODUCTION PROCESS THEREOF, AND ELECTROCHEMICAL DEVICES AND FABRICATION PROCESS THEREOF

(75) Inventors: Go Sudo, Kanagawa (JP); Kenji Katori, Kanagawa (JP); Kiyoshi Yamaura, Kanagawa (JP)

(73) Assignee: Sony Corporation, Tokyo (JP)

( * ) Notice: Subject to any disclaimer, the term of this patent is extended or adjusted under 35 U.S.C. 154(b) by 539 days.

(21) Appl. No.: 10/489,093

(22) PCT Filed: Jul. 22, 2003

(86) PCT No.: PCT/JP03/09257

§ 371 (c)(1),
(2), (4) Date: Mar. 9, 2004

(87) PCT Pub. No.: WO2004/010525

PCT Pub. Date: Jan. 29, 2004

(65) Prior Publication Data

US 2004/0234840 A1    Nov. 25, 2004

(30) Foreign Application Priority Data

Jul. 22, 2002    (JP)    ............................. 2002-212364

(51) Int. Cl.
*H01M 4/00*    (2006.01)
*H01M 4/88*    (2006.01)
(52) U.S. Cl. ........................................ 429/42; 502/101
(58) Field of Classification Search .................. 429/42; 502/101
See application file for complete search history.

(56) References Cited

FOREIGN PATENT DOCUMENTS

JP    2001-57216    2/2001
JP    2001-348439    12/2001

*Primary Examiner*—Patrick Joseph Ryan
*Assistant Examiner*—Thomas H. Parsons
(74) *Attorney, Agent, or Firm*—Bell, Boyd & Lloyd LLP

(57) ABSTRACT

Catalytic electrodes, and their production process, as well as electrochemical devices and their fabrication process are provided. The catalytic electrode includes a catalyst layer, which contains an electrolyte composed of a solid polymer such as polytetrafluoroethylene and also contains catalyst particles such as Pt. The solid polymer electrolyte has a crosslinked structure. The catalytic electrode is produced by forming the catalyst layer with the solid polymer and catalyst contained therein, and exposing the catalyst layer to radiation to crosslink the solid polymer and to bond side chains to the solid polymer, and further to introduce into the side chains ion dissociative groups.

30 Claims, 2 Drawing Sheets

CATALYTIC ELECTRODES AND PRODUCTION PROCESS THEREOF, AND ELECTROCHEMICAL DEVICES AND FABRICATION PROCESS THEREOF

CROSS REFERENCES TO RELATED APPLICATIONS

The present application claims priority to Japanese Patent Document Nos. P2002-212364 filed on Jul. 22, 2002, the disclosure of which is herein incorporated by reference.

BACKGROUND OF THE INVENTION

This present invention relates to catalytic electrodes and production process thereof, and also to electrochemical devices and fabrication process thereof.

As electrolytes for solid polymer fuel cells, perfluorosulfonate ionomers (PFSIs) led by "Nafion" (product of E. I. DuPont de Nemours & Co.) have been used conventionally. Employed, for example, as diaphragms for permitting conduction of protons between an anode and a cathode while preventing direct mixing of reactant gases include those obtained by dissolving PFSI in an alcohol (e.g., ethanol or isopropanol) or the like and then conducting casting, drying, and heating treatment; and those obtained by directly processing a resin, in which intramolecular sulfonate groups are bonded with cations such as sodium ions, into a sheet form and then substituting the cations with hydrogen atoms.

In a catalyst layer where an actual reaction is conducted, it is important to form a three-phase interface at which gases, a solid electrolyte, and a catalyst are brought into contact with each other. Therefore, the catalyst layer is formed, for example, by mixing a PFSI-dissolved solution with the catalyst and coating the resultant mixture directly on an electrolyte membrane or coating it on a "TEFLON" (trademark), (polytetrafluoroethylene (PTFE)) sheet, or the like and then transferring the resultant coating layer onto an electrolyte membrane.

In MEA (Membrane and Electrode Assembly) formed by using PFSI as described above, the durabilities of the ion conductor and catalyst layer are dependent upon the durability of PFSI.

In a fuel cell formed using PFSI as mentioned above, however, PFSI dissolves in alcohol or water as a solvent. PFSI, therefore, was caused to swell or was dissolved in certain instances not only during long-time operations but also even during short-time operations when the operations were performed under high-temperature conditions or methanol was used as a fuel. As a result, PFSI was caused to separate from or to flow out of MEA, which makes up the fuel cell, so that impairments in characteristics were observed. In particular, any flowing-out or separation of PFSI inside the catalyst layer reduces the reaction area, and hence, leads to substantial impairments in characteristics.

In the meantime, processes for forming electrodes for fuel cells from catalysts and polytetrafluoroethylene (PTFE) have been proposed, for example, in Japanese Patent Laid-open No. 2001-57216 as a production process of electrodes for phosphoric acid fuel cells.

FIG. 4 is a simplified schematic cross-sectional view of a conventional electrode formed from a catalyst and polytetrafluoroethylene (PTFE). As depicted in FIG. 4, an electrode 11 is composed of a current collector 13 and a catalyst layer 12 formed on the current collector 13, and the catalyst layer 12 is formed from PTFE 14 and catalyst particles 15 such as platinum particles.

The conventional electrode 11, which is provided with the catalyst layer 12 formed of PTFE 14 and the catalyst particles 15, however, still requires improvements in the assurance of internal ion-conducting paths, mechanical strength, and thermal stability of the catalyst layer 12.

SUMMARY OF THE INVENTION

The present invention provides catalytic electrodes, which are excellent in durability, undergo neither dissolution nor separation, and can be used over long time without impairments in characteristics, and their production process as well as electrochemical devices and their fabrication process.

Specifically, the present invention in an embodiment relates to a catalytic electrode provided with a catalyst layer containing an electrolyte, which is composed of a solid polymer, and a catalyst. The solid polymer electrolyte has a crosslinked structure.

The present invention also in an embodiment relates to a process for the production of a catalytic electrode. The process includes forming a catalyst layer with a solid polymer and a catalyst contained therein, and exposing the catalyst layer to radiation to crosslink the solid polymer and to bond side chains to the solid polymer and further, to introduce into the side chains an ion dissociative group.

The present invention in an embodiment is also concerned with an electrochemical device including a first electrode, a second electrode, and an ion conductor held between these electrodes. At least one of the electrodes is provided with a catalyst layer containing an electrolyte, which is composed of a solid polymer, and a catalyst.

The present invention further pertains to a process for the fabrication of an electrochemical device including a first electrode, a second electrode, and an ion conductor held between these electrodes. The process includes the step of forming a catalyst layer with a solid polymer and a catalyst contained therein, and exposing the catalyst layer to radiation to crosslink the solid polymer and to bond side chains to the solid polymer and further, to introduce into the side chains an ion dissociative group, such that a catalyst layer for forming at least one of the electrodes is obtained.

As mentioned above, PFSI, which is a solid polymer electrolyte, is primarily used as an electrolyte and a binder in the electrodes of an electrochemical device such as a fuel cell. This PFSI, when incorporated in the electrodes, functions as the binder, with its intermolecular bonds relying upon intermolecular force and electrostatic force. PFSI, therefore, may be dissolved in a solvent such as alcohol or water under such conditions that its intermolecular bonds are not sufficiently strong compared with its affinity with the solvent. Under conditions that PFSI dissolves in alcohol or water, PFSI undergoes separation or flowing-out, leading to reductions in the characteristics of the device.

In the present invention, on the other hand, the catalyst layer in an embodiment is formed, and the catalyst layer is exposed to the radiation to crosslink the solid polymer and to bond side chains to the solid polymer and further, to introduce into the side chains an ion dissociative group. The crosslinked structure of the solid polymer electrolyte are formed of covalent bonds, and therefore, are sufficiently strong bonds compared with the affinity of the solid polymer electrolyte with the solvent.

According to the present invention in an embodiment, the solid polymer electrolyte has the above-mentioned crosslinked structure, and the crosslinks are covalent bonds, which are sufficiently strong bonds compared with the affinity of the solid polymer electrolyte with the solvent.

Without separation or flowing-out as in the case of the above-described PFSI, the catalytic electrode, therefore, is excellent in durability, permits stable formation of ion-conducting paths, is also provided with improved mechanical strength and thermal stability, and can be used over long time without impairments in characteristics.

In an embodiment, the present invention provides catalytic electrodes, which are excellent in durability, undergo neither dissolution nor separation, and can be used over long time without impairments in characteristics, and their production process, as well as electrochemical devices and their fabrication process. The catalytic electrode includes a catalyst layer, which contains an electrolyte composed of a solid polymer such as polytetrafluoroethylene and also contains catalyst particles such as Pt. The solid polymer electrolyte has a crosslinked structure. The catalytic electrode is produced by forming the catalyst layer with the solid polymer and catalyst contained therein, and exposing the catalyst layer to radiation to crosslink the solid polymer and to bond side chains to the solid polymer, and further to introduce into the side chains ion dissociative groups. A electrochemical device in an embodiment is constructed of an anode, a cathode, and an ion conductor held between these electrodes, and at least one of these electrodes is a catalytic electrode having a similar catalyst layer as described above. A fabrication process in an embodiment of the electrochemical device is also disclosed.

Additional features and advantages of the present invention are described in, and will be apparent from, the following Detailed Description of the Invention and the figures.

DETAILED DESCRIPTION OF THE INVENTION

Figure 1:
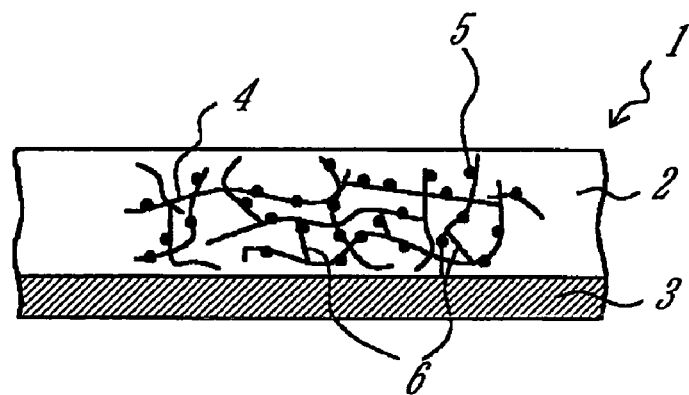
FIG. 1 is a schematic cross-sectional view of a catalytic electrode according to an embodiment of the present invention.

In the catalytic electrode according to an embodiment of the present invention, side chains having ion dissociative groups, may desirably be bonded to the solid polymer. For example, it is desired to use polytetrafluoroethylene as the solid polymer, sulfonate groups as the ion dissociative groups and polystyrene graft side chains as the side chains.

In this case, the catalytic electrode according to an embodiment of the present invention can be obtained by exposing the catalytic layer to the radiation at an elevated temperature to conduct the above-described crosslinking of the solid polymer, and then, exposing the catalytic layer to the radiation at room temperature to bond the side chains to the solid polymer and further to introduce into the side chains the ion dissociative groups. It is to be noted that electron beams or heavy ion beams can be irradiated in place of gamma beams.

Described specifically, the catalyst layer are firstly exposed, for example, to gamma rays as the above-described radiation as much as 5 to 300 kGy at 300 to 365° C. in an inert gas, the oxygen partial pressure of which is 10 Torr (about 1333 Pa) or lower, or under reduced pressure to crosslink, for example, polytetrafluoroethylene as the solid polymer.

The polytetrafluoroethylene as the solid polymer, the polytetrafluoroethylene having been formed by high-temperature exposure as described above and having the above-described crosslinked structure, may desirably have a crosslinked structure of the branched long-chain type, in which polytetrafluoroethylene chains are bonded together via branch chains such that the crosslinked structure is formed by tangling of branch chains and bonding of branch chains at ends thereof.

It is to be noted that the characteristics of the above-described crosslinked structure of the polytetrafluoroethylene can be altered by selecting the temperature of exposure to the radiation and the dose of the radiation within the above-described ranges as desired. For example, selection of a dose of 200 kGy makes it possible to obtain a solid polymer having a greater number of long-chain branches, in other words, higher durability than the exposure to radiation as little as 5 kGy, because owing to the inclusion of long-chain branches in a large number, the tangling of the branches, and the chemical bonding between the branches themselves can provide the solid polymer with high strength and excellent durability.

The catalyst layer is then exposed, for example, to gamma rays as the radiation as much as 5 to 100 kGy at room temperature in an inert gas such that in a temperature range not higher than the boiling point of styrene monomer and a solvent, generally in a range of from 40 to 60° C., a grafting reaction is conducted in styrene alone or in a solution, which has been obtained by diluting styrene monomer with a solvent such as benzene, to bond, for example, polystyrene graft side chains as the above-described side chains on the crosslinked polytetrafluoroethylene. As existence of oxygen inhibits the grafting reaction, the series of these operations have to be conducted in an inert gas such as argon gas, nitrogen gas or the like after removing oxygen from the monomer or solution in argon gas or nitrogen gas. The degree of grafting is proportional to the dose (i.e., the number of active species), so that a higher dose results in the formation of graft side chains in a greater number.

After reacted at a temperature of from 40 to 60° C. for 1 to 24 hours, the solid polymer having the crosslinked structure and carrying the side chains bonded thereon is taken out of the reaction mixture, and then, immersed in a toluene of 40° C. for 12 hours to extract styrene and styrene polymer. Subsequently, the solid polymer is dried at 40° C. in a vacuum.

According to the above-mentioned bonding method of the side chains, the polytetrafluoroethylene is exposed beforehand to the radiation at a temperature of from 300 to 365° C. such that bonds are introduced into the polytetrafluoroethylene between its long-chain branches and also between its branch ends to conduct the above-described crosslinking. Subsequently, the crosslinked polytetrafluoroethylene is exposed to the radiation around room temperature to conduct the grafting of styrene. It is, therefore, possible to substantially increase the graft ratio while retaining the excellent durability of the polytetrafluoroethylene by the crosslinking.

By introducing sulfonate groups into the polystyrene graft side chains, the solid polymer electrolyte can be formed. As conditions for this sulfonation, 0.2 to 0.5 mol/L of chlorosulfonic acid is reacted at room temperature to 60° C. for 2 to 24 hours while using tetrachloromethane, chloroform, dichloromethane, 1,2-dichloroethane, 1,1,2,2-tetrachloroethane or the like as a solvent. After reacted for a predetermined time, the sample is taken out and is thoroughly washed to remove the solvent and unreacted chlorosulfonic acid. At this time, hydrolysis takes place so that sulfonate groups are formed to provide the above-described solid polymer electrolyte.

The ion dissociative groups are groups, which can release protons, sodium ions, potassium ions, or the like through dissociation. The above-described sulfonate groups are preferred, but in addition, carboxylate groups, phosphate groups, and the like can also be mentioned. This applies equally to the subsequent description according to an embodiment.

As the solid polymer, the above-described polytetrafluoroethylene is preferred, but in addition, polyfluoroalkoxides and the like can also be mentioned. This applies equally to the subsequent description according to an embodiment.

As the catalyst, the above-described platinum is preferred, but in addition, alloys of platinum with ruthenium, iron, nickel, cobalt, and the like can also be mentioned. This applies equally to the subsequent description according to an embodiment. For the hydrogen generator to be described subsequently herein, nickel, iridium oxide, and the like can also be employed.

FIG. 1 is a schematic cross-sectional view of a catalytic electrode 1 according to the present invention. As shown in FIG. 1, a catalytic electrode 1 according to the present invention can be constructed as an integrated gas-diffusible catalytic electrode by forming a catalyst layer 2 on a porous current collector 3.

The catalyst layer 2 contains polytetrafluoroethylene 4 as the solid polymer and catalyst particles 5 such as platinum. By exposing the gas-diffusible catalytic electrode to the above-described radiation, crosslinks 6 are formed in the polytetrafluoroethylene 4, and further, the above-described side chains having the ion dissociative groups can be bonded on the polytetrafluoroethylene although illustration of such side chains is omitted.

According to the catalytic electrode 1 based on the present invention, the crosslinks 6 in the polytetrafluoroethylene 4 are covalent bonds, which are sufficiently strong bonds compared with the affinity of the polytetrafluoroethylene with a solvent. Without separation or flowing-out of the polytetrafluoroethylene 4, the catalytic electrode, therefore, is excellent in durability, assures ion-conducting paths, is also provided with improved mechanical strength and thermal stability, and can be used over long time without impairments in characteristics.

Catalytic electrodes according to the present invention can be applied to fuel cells or to electrochemical devices constructed as hydrogen generators.

In a basic structure constructed of a first electrode, a second electrode, and an ion conductor held between these electrode, for example, the catalyst layer or catalytic electrode according to the present invention can be used as at least one of the first electrode and second electrode.

As the ion conductor, any material can be used insofar as it has been used as an ion exchange membrane. Use of an ion conductor composed of a solid electrolyte having a crosslinked structure is preferred.

This solid electrolyte may preferably be an electrolyte composed of a solid polymer on which side chains having ion dissociative groups such as sulfonate groups are bonded. Illustrative of the side chains are polystyrene graft side chains, while illustrative of the solid polymer is polytetrafluoroethylene.

As a fabrication process for the electrochemical device according to the present invention, it can be fabricated by producing catalytic electrodes according to the present invention by above-mentioned series of operations and reactions and then arranging the above-described ion conductor in contact with the catalyst layers of these catalytic electrodes.

As an alternative, especially when polytetrafluoroethylene on which side chains having ion dissociative groups such as sulfonate groups are bonded is used as the above-mentioned ion conductor, it is preferred to expose polytetrafluoroethylene as a precursor for the ion conductor to the above-described radiation while holding the polytetrafluoroethylene between the electrodes.

Figure 2:
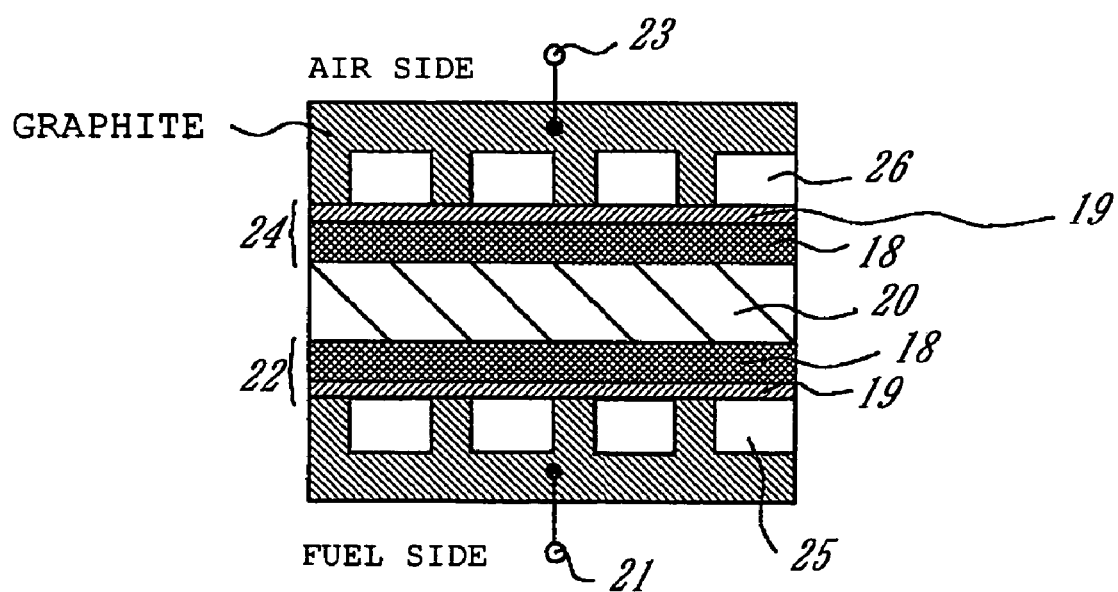
FIG. 2 is a schematic cross-sectional view of a fuel cell making use of catalytic electrodes according to an embodiment of the present invention.

FIG. 2 illustrates a fuel cell as a specific example making use of catalytic electrodes according to the present invention. Catalyst layers 18 in FIG. 2 contain, for example, polytetrafluoroethylene as the solid polymer and the above-described catalyst particles such as platinum. The polytetrafluoroethylene has the above-described crosslinked structure and carries polystyrene graft side chains bonded thereon as the above-described side chains having the ion dissociative groups such as sulfonate groups.

The catalytic electrodes according to the present invention are constructed as porous gas-diffusible catalytic electrodes each of which is formed of the catalyst layer 18 and, for example, a carbon sheet 19 as a porous, gas-diffusible current collector. Further, an ion conducting portion 20 is held between the first electrode and second electrode both of which make use of the catalytic electrodes according to the present invention.

The ion conducting portion 20 is composed of polytetrafluoroethylene having a crosslinked structure and carrying polystyrene graft side chains bonded thereon as the above-described side chains having the ion dissociative groups such as sulfonate groups.

The fuel cell has an anode (fuel electrode or hydrogen electrode) 22 and a cathode (oxygen electrode) 24, which are arranged opposite to each other. The anode is provided with a terminal 21 and makes use of the catalytic electrode according to the present invention, while the cathode is provided with a terminal 23 and makes use of the catalytic electrode according to the present invention although the use of the catalytic electrode as the cathode is not essential. The ion conducting portion 20 is held between these electrodes.

Upon use, hydrogen is fed through $H_2$ flow channels 25 on the side of the anode 22. While the fuel ($H_2$) is flowing through the flow channels 25, hydrogen ions are produced. These hydrogen ions move through the ion conducting portion 20 to the side of the cathode 24, where they react with oxygen (air) flowing through $O_2$ flow channels 26. As a consequence, desired electromotive force is outputted.

Reactions at the individual electrodes will be shown below:

$H_2 \rightarrow 2H^+ + 2e^-$          Anode

$2H^+ + \frac{1}{2}O_2 + 2e^- \rightarrow H_2O$          Cathode

As a fabrication process of the fuel cell, it can be fabricated by producing catalytic electrodes of the present invention beforehand in accordance with the above-mentioned series of operations and reactions and forming the above-described ion conductor in advance separately from the production of the catalytic electrodes, and arranging the ion conductor in contact with the catalyst layers of the catalytic electrodes.

As an alternative, especially when polytetrafluoroethylene with the above-described side chains bonded thereon—the side chains having the ion dissociative groups such as sulfonate groups—is used as the ion conductor as mentioned above, it is preferred to provide the gas-diffusible catalytic electrode having the catalyst layer, which have not been exposed to radiation, as the first electrode and/or the second electrode and to expose the catalyst layer to the radiation with polytetrafluoroethylene being held as a precursor for the ion conductor between the electrodes.

In the fuel cell fabricated as described above, the catalytic electrodes according to the present invention make up the first electrode and second electrode, respectively, the solid polymer electrolyte has the above-described crosslinked structure, and the crosslinks are covalent bonds, which are sufficiently strong bonds compared with the affinity of the solid polymer electrolyte with the solvent. Without separation or flowing-out of the solid polymer electrolyte, the fuel cell, therefore, is excellent in durability, assures ion-conducting paths, is also provided with improved mechanical strength and thermal stability, and can be used over long time without impairments in characteristics.

Figure 3:
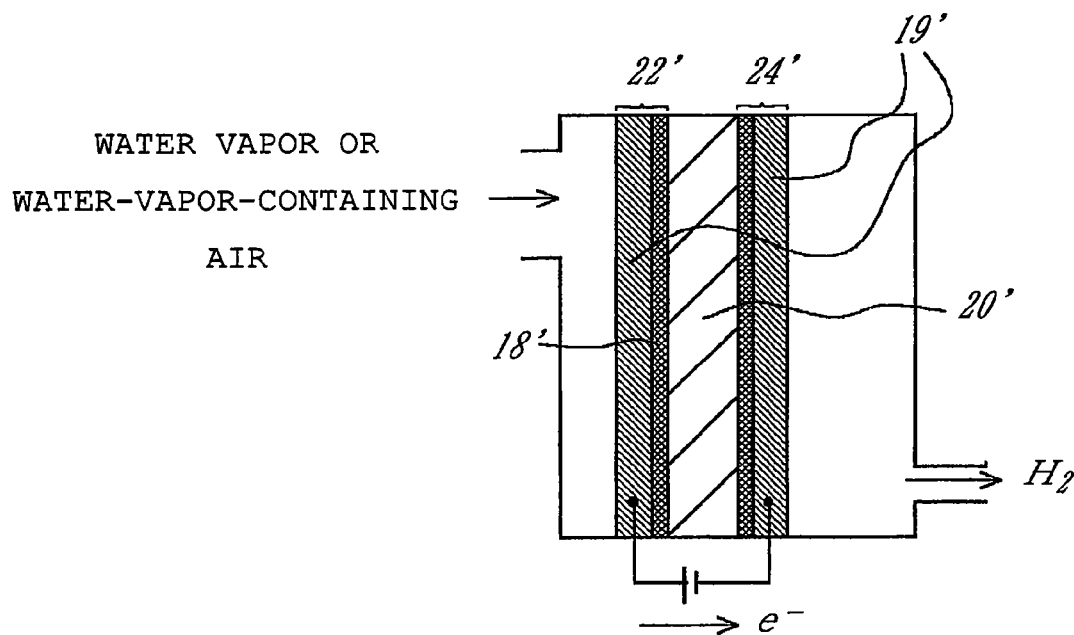
FIG. 3 is a schematic cross-sectional view of a hydrogen generator making use of catalytic electrodes according to an embodiment of the present invention.
Figure 4:
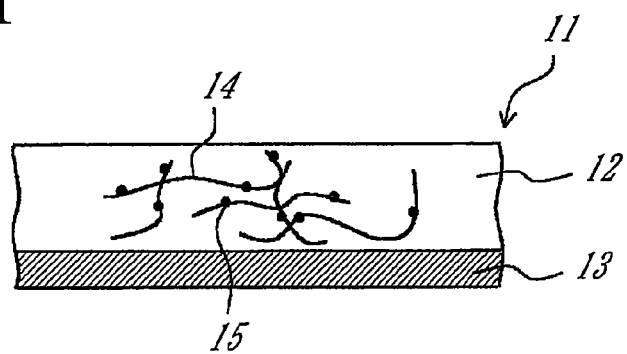
FIG. 4 is a simplified schematic cross-sectional view of a catalytic electrode according to a conventional example.

FIG. 3 illustrates by way of example a hydrogen generator as a specific example making use of catalytic electrodes of the present invention as the first electrode and second electrode.

Reactions at the individual electrodes will be shown below:

The required theoretical voltage is 1.23 V or higher.

Catalyst layers 18' in FIG. 3 contain, for example, polytetrafluoroethylene as the solid polymer and the above-described catalyst particles such as platinum and/or the like. The polytetrafluoroethylene has the above-described crosslinked structure, and carries polystyrene graft side chains bonded as the side chains thereon and having, for example, sulfonate groups as ion dissociative groups and/or the like.

The catalytic electrodes are constructed as porous gas-diffusible catalytic electrodes each of which is composed of the catalyst layer 18' and, for example, a carbon sheet 19' as a porous gas-diffusible current collector. Further, an ion conducting portion 20' is held between the first electrode and second electrode, which make use of catalytic electrodes according to the present invention.

Upon using this hydrogen generator, water vapor or water-vapor-containing air is supplied on the side of an anode 22'. This water, water vapor, or water-vapor-containing air is decomposed on the side of the anode 22' to produce oxygen gas, electrons, and protons (hydrogen ions). The electrons and protons so produced move to the side of a cathode 24', and on the side of the cathode 24', they are converted into hydrogen gas so that hydrogen gas is formed as desired.

In the hydrogen generator of the construction as described above, the catalytic electrode according to the present invention makes up at least one of the first electrode and second electrode, the solid polymer electrolyte has the above-described crosslinked structure, and the crosslinks are covalent bonds, which are sufficiently strong bonds compared with the affinity of the solid polymer electrolyte with the solvent. Without separation or flowing-out of the solid polymer electrolyte, the hydrogen generator, therefore, is excellent in durability, assures ion-conducting paths, is also provided with improved mechanical strength and thermal stability, and can be used over long time without impairments in characteristics.

Exemplified as the ion conducting portion was the ion conductor, which was composed of polytetrafluoroethylene with the above-described side chains bonded thereon and having the above-described ion dissociative groups. In addition, commonly-employed "Nafion" (perfluorosulfonate ionomer, product of E. I. DuPont de Nemours & Co.) and the like can also be exemplified.

The present invention will hereinafter be described specifically based on an example.

Using an ultrasonic homogenizer or the like, a catalyst with fine platinum particles carried on 20 to 40 wt. % fine carbon particles was dispersed in purified water until the secondary particle size of the catalyst was reduced at least to smaller than 1 μm.

A PTFE dispersion ("30J", DU PONT-MITSUI POLYCHEMICALS CO., LTD.; or the like) was added to the resultant catalyst dispersion to give a PTFE/carbon ratio of from 0.5 to 1.2, followed by dispersion in the ultrasonic homogenizer until the catalyst and PTFE particles were sufficiently mixed.

An acid such as nitric acid was added to the suspension to adjust the pH below 3 such that the catalyst and PTFE particles were caused to aggregate. The coating formulation so prepared was applied on sheets of carbon paper to give a platinum concentration of from 0.5 to 3.0 mg/cm², followed by filtration to remove the dispersion medium.

The carbon paper sheets with the catalyst and PTFE coated thereon were dried, and then baked at 240 to 300° C. for 30 minutes in a nitrogen atmosphere to remove impurities such as a surfactant added in the PTFE dispersion.

Using two of the thus-obtained carbon paper sheets with the catalyst and PTFE coated thereon, a PTFE sheet (thickness: 10 to 100 μm or so) was held between the carbon paper sheets in such a way that the surfaces of the carbon paper sheets, the surfaces carrying coatings of the catalyst and PTFE adhered thereon, were kept in contact with the PTFE sheet, and in a nitrogen atmosphere, the resulting multilayered solid was baked at 350° C. for 10 minutes while pressing it under 5 to 30 kg/cm² or so.

The PTFE in the thus-obtained multilayered solid (carbon paper/catalyst, PTFE layer/PTFE sheet/catalyst, PTFE layer/carbon paper) was exposed around 340° C. to gamma rays as much as 70 kGy while using $^{60}$Co as a radiation source. As a result, PTFE was subjected to free-radical crosslinking polymerization.

The multilayered solid in which the PTFE had been crosslinked was further exposed at room temperature to gamma rays as much as 30 kGy to form radical sites. In that state, the multilayered solid was immersed in a solution of styrene monomer diluted in benzene such that styrene was grafted at 60° C. from the active sites to bond side chains together.

The thus-prepared multilayered solid was immersed in 0.3 M chlorosulfuric acid, and sulfonation was conducted at 50° C. for 15 hours. As a result, the constituent polymers of the catalyst layer and ion conductor were converted into crosslinked polymers in each of which styrene and sulfonic acid were grafted on the PTFE having the crosslinked structure. MEA was therefore readily fabricated.

It is to be noted that the above-described example can be modified in various ways on the basis of the technical concept of the present invention.

The present invention has been described by using, for example, polytetrafluoroethylene as the solid polymer, the sulfonate groups as the ion dissociative groups and polystyrene graft side chains as the side chains. It is, however, to be noted that the present invention shall not be limited to such examples.

It should also be noted that in electrochemical devices according to an embodiment of the present invention such as the above-described fuel cell and hydrogen generator, their shapes, constructions, materials, and the like can be selectively determined as desired insofar as such selections do not depart from the present invention.

As mentioned above, according to the present invention, the catalyst layer is formed, and the catalyst layer is exposed to the radiation to crosslink the solid polymer and to bond side chains to the solid polymer and further, to introduce into the side chains the ion dissociative groups. The crosslinked structure of the solid polymer electrolyte are formed of covalent bonds, and therefore, are sufficiently strong bonds compared with the affinity of the solid polymer electrolyte with the solvent.

Therefore, the solid polymer electrolyte has the above-mentioned crosslinked structure, and the crosslinks are covalent bonds, which are sufficiently strong bonds compared with the affinity of the solid polymer electrolyte with the solvent. Without separation or flowing-out as in the conventional art, the catalytic electrode and electrochemical device, therefore, are excellent in durability, permit stable formation of ion-conducting paths, are also provided with improved mechanical strength and thermal stability, and can be used over long time without impairments in characteristics.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A catalytic electrode comprising a catalyst layer containing an electrolyte that includes solid polymer and a catalyst, wherein the solid polymer includes a crosslinked structure.

2. The catalytic electrode according to claim 1, wherein the solid polymer includes one or more side chains bonded thereto and has an ion dissociative group.

3. The catalytic electrode according to claim 2, wherein the ion dissociative group includes a sulfonate group, and the side chains include polystyrene graft side chains.

4. The catalytic electrode according to claim 1, wherein the solid polymer includes a polytetrafluoroethylene.

5. A process for the production of a catalytic electrode, the process comprising the steps of: forming a catalyst layer with a solid polymer and a catalyst contained therein; exposing the catalyst layer to radiation to crosslink the solid polymer and to bond one or more side chains to the solid polymer; and introducing into the side chains an ion dissociative group.

6. The process according to claim 5, wherein the catalyst layer is exposed to radiation at an elevated temperature to conduct the crosslinking of the solid polymer and then, at room temperature to bond the side chains to the solid polymer and further to introduce into the side chains the ion dissociative group.

7. The process according to claim 6, wherein one or more polystyrene graft side chains are bonded as the side chains, and, as the ion dissociative group, a sulfonate group is then introduced into the polystyrene graft side chains.

8. The process according to claim 6, wherein the solid polymer is crosslinked by exposing the catalyst layer to radiation that ranges from about 5 kGy to about 300 kGy at about 300° C. to about 365° C. and not higher than about 10 Torr (about 1333 Pa), and wherein the side chains are bonded by exposing the catalyst layer to radiation as much as about 5 kGy to about 100 kGy at room temperature in an inert gas.

9. The process according to claim 8, wherein the radiation includes gamma rays.

10. The process according to claim 5, wherein the solid polymer includes polytetrafluoroethylene.

11. An electrochemical device comprising a first electrode, a second electrode, and an ion conductor held between the electrodes, wherein at least one of the electrodes includes a catalyst layer containing an electrolyte, that is composed of a solid polymer, and a catalyst, wherein some or more side chains having an ion dissociative group are bonded to the solid polymer.

12. The electrochemical device according to claim 11, wherein the ion dissociative group includes a sulfonate group, and the side chains include polystyrene graft side chains.

13. The electrochemical device of claim 11, wherein the solid polymer is polytetrafluoroethylene.

14. The electrochemical device of claim 11, which is constructed as a fuel cell.

15. The electrochemical device of claim 11, which is constructed as a hydrogen generator.

16. An electrochemical device comprising a first electrode, a second electrode, and an ion conductor held between the electrodes, wherein at least one of the electrodes includes a catalyst layer containing an electrolyte, that is composed of a solid polymer, and a catalyst, wherein the ion conductor is a solid electrolyte that has a crosslinked structure.

17. The electrochemical device according to claim 16, wherein the solid electrolyte includes an electrolyte comprising a solid polymer with one or more side chains bonded thereto and having an ion dissociative group.

18. The electrochemical device according to claim 17, wherein the ion dissociative group includes a sulfonate group, and the side chains are polystyrene graft side chains.

19. The electrochemical device according to claim 17, wherein the solid polymer is polytetrafluoroethylene.

20. A process for the fabrication of an electrochemical device including a first electrode, a second electrode, and an ion conductor held between the electrodes, the process comprising the steps of:

forming a catalyst layer with a solid polymer and a catalyst contained therein; exposing the catalyst layer to radiation to crosslink the solid polymer and to bond side chains to the solid polymer; and introducing into the side chains an ion dissociative group such that a catalyst layer for forming at least one of the electrodes is obtained.

21. The process according to claim 20, wherein the catalyst layer is exposed to radiation at an elevated temperature to conduct the crosslinking of the solid polymer, and wherein the catalyst layer is then exposed to radiation at room temperature to bond the side chains to the solid polymer and further to introduce the ion dissociative group into the side chains to obtain the catalyst layer.

22. The process according to claim 21, wherein one or more polystyrene graft side chains are bonded as the side chains, and, as the ion dissociative group, a sulfonate group is then introduced into the polystyrene graft side chains.

23. The process according to claim 21, wherein the solid polymer is crosslinked by exposing the catalyst layer to radiation as much as about 5 kGy to about 300 kGy at about 300° C. to about 365° C. and not higher than about 10 Torr (about 1333 Pa), and wherein the side chains are bonded by exposing the catalyst layer to radiation as much as about 5 kGy to about 100 kGy at room temperature in an inert gas.

24. The process according to claim 23, wherein the radiation includes gamma rays.

25. The process according to claim 20, wherein the solid polymer includes polytetrafluoroethylene.

26. The process according to claim 20, wherein a solid electrolyte having a crosslinked structure is used as the ion conductor.

27. The process according to claim 26, wherein an electrolyte comprising a solid polymer is used as the solid electrolyte, and wherein the solid polymer carries one or more side chains bonded thereto and has an ion dissociative group.

28. The process according to claim 27, wherein the ion dissociative group and the side chains include polystyrene graft side chains.

29. The process according to claim 27, wherein the solid polymer includes polytetrafluoroethylene.

30. The process according to claim 20, wherein the catalyst layer is exposed to radiation with the ion conductor being held between the electrodes.

* * * * *